United States Patent
Xu (10) Patent No.: US 9,467,820 B2
(45) Date of Patent: Oct. 11, 2016

(54) COMMUNICATION METHOD AND SYSTEM FOR MACHINE-TYPE COMMUNICATION UE

(75) Inventor: Hui Xu, Shenzhen (CN)

(73) Assignee: ZTE CORPORATION, Shenzhen, Guangdong Province (CN)

( * ) Notice: Subject to any disclaimer, the term of this patent is extended or adjusted under 35 U.S.C. 154(b) by 0 days.

(21) Appl. No.: 14/411,343

(22) PCT Filed: Aug. 24, 2012

(86) PCT No.: PCT/CN2012/080567
§ 371 (c)(1),
(2), (4) Date: Dec. 24, 2014

(87) PCT Pub. No.: WO2014/000337
PCT Pub. Date: Jan. 3, 2014

(65) Prior Publication Data
US 2015/0382157 A1   Dec. 31, 2015

(30) Foreign Application Priority Data
Jun. 26, 2012   (CN) .......................... 2012 1 0213456

(51) Int. Cl.
*H04H 20/71* (2008.01)
*H04W 4/06* (2009.01)
(Continued)

(52) U.S. Cl.
CPC ............... *H04W 4/06* (2013.01); *H04W 4/005* (2013.01); *H04W 4/08* (2013.01); *H04W 48/12* (2013.01); *H04W 68/025* (2013.01);
(Continued)

(58) Field of Classification Search
None
See application file for complete search history.

(56) References Cited

U.S. PATENT DOCUMENTS

| 2011/0134841 | A1* | 6/2011 | Shaheen | H04W 4/00 370/328 |
| 2011/0201343 | A1* | 8/2011 | Pinheiro | H04W 76/046 455/450 |

(Continued)

FOREIGN PATENT DOCUMENTS

| CN | 102238477 A | 11/2009 |
| CN | 102316450 A | 1/2012 |

(Continued)

OTHER PUBLICATIONS

International Search Report (Form PCT/ISA/210) for PCT/CN2012/080567 mailed Apr. 4, 2013.

(Continued)

*Primary Examiner* — Michael J Moore, Jr.
(74) *Attorney, Agent, or Firm* — Koppel, Patrick, Heybl & Philpott (57) ABSTRACT

A communication method and system for a Machine-Type Communication (MTC) User Equipment (UE) are disclosed. The method includes that: at least one MTC UE in an MTC UE group receives, based on group paging information received, broadcast information carrying group trigger information from an MTC server, wherein the group trigger information is used for triggering the at least one MTC UE in the MTC UE group; and the at least one UE communicates with the MTC server based on the group trigger information. In the disclosure, the group trigger information is broadcast to the MTC UE group through the broadcast information, so that a plurality of MTC UE in one group is triggered simultaneously, thus optimizing group triggering process, and reducing network resources occupied in the group triggering process.

15 Claims, 5 Drawing Sheets

(51) Int. Cl.
*H04W 4/00* (2009.01)
*H04W 4/08* (2009.01)
*H04W 68/02* (2009.01)
*H04W 76/00* (2009.01)
*H04W 48/12* (2009.01)
*H04W 72/00* (2009.01)
*H04W 88/08* (2009.01)

(52) U.S. Cl.
CPC ....... *H04W 72/005* (2013.01); *H04W 76/002* (2013.01); *H04W 88/08* (2013.01)

(56) References Cited

U.S. PATENT DOCUMENTS

| | | | |
|---|---|---|---|
| 2012/0040700 A1 | 2/2012 | Gomes et al. | |
| 2012/0207094 A1* | 8/2012 | Liao | H04W 4/005 370/328 |
| 2012/0214520 A1* | 8/2012 | Bergqvist | H04W 68/02 455/458 |
| 2013/0115993 A1* | 5/2013 | Jain | H04W 4/005 455/517 |
| 2013/0136072 A1* | 5/2013 | Bachmann | H04W 4/00 370/329 |
| 2013/0155954 A1* | 6/2013 | Wang | H04W 4/005 370/328 |
| 2013/0336111 A1* | 12/2013 | Vos | H04W 4/06 370/230 |
| 2014/0011505 A1* | 1/2014 | Liao | H04W 68/025 455/450 |
| 2014/0194111 A1* | 7/2014 | Aso | H04W 4/001 455/419 |
| 2015/0050955 A1* | 2/2015 | Kim | H04W 4/005 455/518 |
| 2015/0119083 A1* | 4/2015 | Chandramouli | H04W 60/04 455/456.3 |
| 2015/0256959 A1* | 9/2015 | Jain | H04W 56/00 370/312 |
| 2015/0341898 A1* | 11/2015 | Xu | H04W 4/005 455/458 |
| 2016/0044441 A1* | 2/2016 | Shaheen | H04W 4/005 370/328 |

FOREIGN PATENT DOCUMENTS

| | | |
|---|---|---|
| CN | 102378120 A | 3/2012 |
| CN | 102469585 A | 5/2012 |
| EP | 2566200 | 3/2013 |
| WO | WO 2012042379 | 4/2012 |

OTHER PUBLICATIONS

"3$^{rd}$ Generation Partnership Project; Technical Specification Group Services and System Aspects; Architecture enhancements to facilitate communications with packet data networks and applications (Release 11)". 3GPP Draft; 23682-B10_CRS_Implemented, 3$^{rd}$ Generation Partnership Project (3GPP), Mobil Competence Centre; 650, Route Des Lucioles; F-06921 Sophia-Aantipolis Cedex; France, Jun. 22, 2012, XP050682649, Retrieved from the Internet: UTL:http://www.3gpp.org/ftp/tsg_sa/WG2_Arch/Latest_SA2_Specs/Draft_Interim/Archive/ [retrieved on Jun. 22, 2012].
Extended European Search Report from European Patent Appl. No. 12880009.1-1853, dated Apr. 1, 2016.

\* cited by examiner

COMMUNICATION METHOD AND SYSTEM FOR MACHINE-TYPE COMMUNICATION UE

TECHNICAL FIELD

The disclosure relates to the field of communications, and more particularly to a communication method and system for a piece of Machine-Type Communication (MTC) User Equipment (UE).

BACKGROUND

The Machine to Machine (M2M) means all technologies and methods for establishing connection between machines. The M2M idea appeared in the 1990s, but it just remained at theory stage. After 2000, with the development of mobile communication technology, it is possible to use the mobile communication technology to implement networking of machines. The M2M service appeared on the market in about 2002, and developed rapidly in the following years; the M2M service becomes the focus of many communication device suppliers and telecom operators. At present, people are outnumbered by machines around the world, so a good market prospect of the M2M technology may be foreseen.

Research on application scenarios of M2M communication shows that providing the M2M communication on a mobile network has a potential market prospect. However, the M2M service presents many new requirements to the system; for enhancing competitiveness of the mobile network in this aspect, it is necessary to optimize the existing mobile network so as to support the M2M communication more effectively.

The existing mobile communication network is designed mainly aiming at the communication between human and human, the communication between machine and machine and the communication between human and machine are optimized insufficiently. Besides, how to provide the M2M communication service at a low cost by the operators is also the key to success of the M2M communication deployment.

Based on the situation above, it is necessary to research a solution that the mobile network supports the M2M communication; the solution is required to reuse the existing network to the greatest extent, and reduce influence of a lot of M2M communication on network and the complexity of operation and maintenance.

At present, the telecommunications market competition is increasingly fierce, the charge keeps plummeting, the profit margin of the operators is declining, and the communication market based on people is getting saturated, so the M2M is a brand-new development opportunity for the operators.

For using mobile network resources effectively, the 3rd Generation Partnership Project (3GPP) presents the MTC, namely service of Machine to Machine communication and Machine to Man communication, whose scope is far beyond the past Human to Human (H2H) communication; the MTC is greatly different from existing H2H communication mode in access control, charge, security, Quality of Service (QoS), service mode and other aspects.

In a 3GPP Evolved Packet System (EPS) architecture, the EPS includes a radio access network (e.g., a UMTS Terrestrial Radio Access Network (UTRAN), an Evolved UTRAN (E-UTRAN), a GSM/EDGE Radio Access Network (GERAN)) and a core network, an Evolved Packet Core (EPC) includes a Mobility Management Entity (MME), a Serving Gateway, a Packet Data Network Gateway (PGW) and other network elements, a General Packet Radio Service (GPRS) core network includes a Service GPRS Support Node (SGSN) and other elements; the E-UTRAN includes an Evolved Node B (eNB).

MTC UE trigger is one of basic requirements for an MTC system; concerns of the requirement are that: for controlling communication of a piece of MTC UE, a way of initiating poll by an MTC server can be adopted to communicate; for communication initiated by the MTC UE, sometimes the MTC server is required to poll data from the MTC UE. If the MTC server fails to inquire or an IP address of the MTC UE is not available, the MTC server can use the MTC UE trigger to establish communication with the MTC UE. If a network cannot trigger the MTC UE, the network reports the MTC server that the MTC UE trigger is failed, and the MTC UE trigger is implemented in the 3GPP through control plane signalling.

The MTC UE trigger includes Mobile Originated (MO) and Mobile Terminating (MT), namely includes that the MTC UE sends or receives information.

Figure 1:
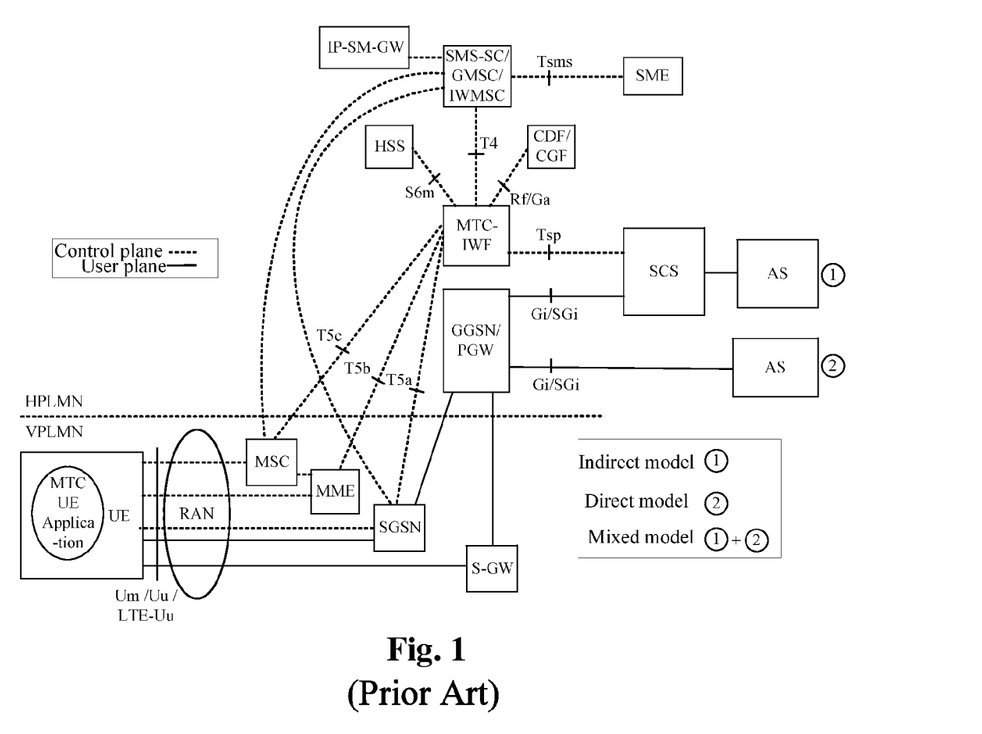
FIG. 1 is a diagram of MTC architecture in the 3GPP according to related art.

For implementing effective transmission of an MTC UE trigger request, a solution presented includes: sending MTC UE trigger information through a T4 interface, or sending MTC UE trigger information through T5 interface control plane signalling, or sending MTC trigger information through a Gi/SGi interface user plane. For the way of sending the MTC UE trigger information through the control plane signalling, the MTC server sends the control plane signalling including the MTC UE trigger information to a network node, the network node parses the MTC UE trigger information in the control plane signalling, and then sends the MTC UE trigger information to a piece of UE. An MTC architecture in the 3GPP is shown in FIG. 1; in a user plane, an MTC application connecting an MTC user communicates with the MTC server through an Application Programming Interface (API), or directly communicates with a Gateway GPRS Support Node (GGSN)/PGW/Evolved Packet Data Gateway (EPDG) in a 3GPP network through the Gi/SGi interface; the MTC server communicates with the GGSN/PGW/EPDG through an MTCi interface; the GGSN/PGW/EPDG communicates with the UE through a Radio Access Network (RAN); in a control plane, the MTC server sends the control plane signalling including the MTC UE trigger information to an MTC Inter-Working Function (MTC-IWF) through an MTCsp interface, or sends the control plane signalling including the MTC UE trigger information to a Short Message Service-Service Centre (SMS-SC)/IP-Short Message-Gateway (IP-SM-GW) through an MTCsms interface; the MTC-IWF or the SMS-SC/IP-SM-GW sends the control plane signalling to the MME/SGSN or a Gateway MSC For Short Message Service (SMS-GMSC) or an SMS router or a Mobile-services Switching Centre (MSC) or a Visitor Location Register (VLR), and then sends to the UE through the RAN; wherein, the MME/SGSN can also acquire, through a Gr/S6a/S6d interface, the control plane signalling from a Home Subscriber Server (HSS) or a Home Location Register (HLR).

A requirement for the MTC UE group is made in the 3GPP TS22.368, for example, the MTC server wants to collect status information of multiple pieces of MTC UE, including: the system relates a piece of MTC UE to a single MTC group; each MTC function based on group is applicable to each member in the MTC group; an identity of the MTC group in the 3GPP network is unique.

A solution on how to trigger a group of MTC UE has not been presented in related technologies.

SUMMARY

The disclosure provides a communication method and system for a piece of MTC UE, for at least solving the problem that a solution on how to trigger a group of MTC UE has not been presented in related are.

According to one aspect of the disclosure, a communication method for a piece of MTC UE is provided, including that: at least one MTC UE in an MTC UE group receives, based on group paging information received, broadcast information carrying group trigger information from an MTC server, wherein the group trigger information is used for triggering the at least one MTC UE in the MTC UE group; and the at least one UE communicates with the MTC server based on the group trigger information.

Preferably, the at least one MTC UE in the MTC UE group receiving, based on group paging information received, the broadcast information carrying the group trigger information from the MTC server includes that: the at least one MTC UE determines that the group paging information is received by itself, wherein the group paging information is used for indicating change of the broadcast information; the at least one MTC UE detects, based on the group paging information, whether the group trigger information carried in the broadcast information is the one needed by itself; if so, the at least one MTC UE acquires the group trigger information from the broadcast information; if not, the at least one MTC UE discards the group trigger information.

Preferably, the at least one MTC UE detecting, based on the group paging information, whether the group trigger information carried in the broadcast information is the one needed by itself includes that: the at least one MTC UE detects, based on a group identity (ID) carried in the group paging information, whether the group paging information corresponds to the MTC UE group; if so, the at least one MTC UE detects, based on a group ID carried in the group trigger information, whether the group trigger information is the one needed by itself; if not, the at least one MTC UE discards the group paging information.

Preferably, before the at least one MTC UE in the MTC UE group receives, based on the group paging information received, the broadcast information carrying the group trigger information from the MTC server, the method further includes that: the MTC server sends the group trigger information to a piece of access network equipment through a service node of the MTC UE group; and the access network equipment which receives the group trigger information broadcasts the group trigger information to an area where the MTC UE group is.

Preferably, the MTC server sending the group trigger information to a piece of access network equipment through the service node of the MTC UE group includes that: an MTC-IWF receives the group trigger information sent by the MTC server, wherein the group trigger information includes at least one of the followings: a group ID of the MTC UE group and a physical area corresponding to the group trigger information; the MTC-IWF updates the physical area in the group trigger information to one of the following identifiers: a Tracking Area Identifier (TAI), a Router Area Identifier (RAI), a Location Area Identifier (LAI) and a cell identifier; the MTC-IWF inquires, based on the group ID of the MTC UE group, subscription information of the MTC UE group and the service node of the MTC UE group; and the MTC-IWF sends, through the service node, the group trigger information to the access network equipment.

Preferably, the MTC-IWF sending, through the service node, the group trigger information to the access network equipment includes that: the MTC-IWF sends the group trigger information to the service node in one of the following ways: a T4 interface, a T5 interface, a Cell Broadcast Centre (CBC) and a Broadcast Multicast Service Centre (BMSC); and the service node sends the group trigger information to the access network equipment, and sends the group paging information to the MTC UE group through the access network equipment.

Preferably, the MTC-IWF sending the group trigger information to the service node in one of the following ways: the T4 interface, the T5 interface, the CBC and the BMSC includes that: the MTC-IWF sends, through the T4 interface, the group trigger information to the service node in form of short message; the MTC-IWF sends, through the T5 interface, the group trigger information to the service node in form of short message or dedicated control signalling; the MTC-IWF sends, through the CBC, the group trigger information to the service node in form of Cell Broadcast Service (CBS); and the MTC-IWF sends, through the BMSC, the group trigger information to the service node in form of Multimedia Broadcast Multicast Service (MBMS).

Preferably, before the at least one MTC UE in the MTC UE group receives, based on the group paging information received, the broadcast information carrying the group trigger information from the MTC server, the method further includes that: a Packet Data Network Gateway (PGW)/Gateway General Packet Radio Service Support Node (GGSN) receives the group trigger information sent by the MTC server, wherein the MTC server and the PGW/GGSN are directly connected through a Gi/SGi interface or connected through a Service Capability Server (SCS); the PGW/GGSN sends a Downlink Data Notification (DDN) to the service node of the MTC UE group through a Signalling Gateway (SGW); the at least one MTC UE receives the group paging information, and establishes a Public Data Network (PDN) connection with the PGW/GGSN, wherein the MTC UE in the MTC UE group shares the PDN connection; and the SGW sends the group trigger information to the MTC UE group through the PDN connection.

Preferably, the broadcast information can be sent in one of the following ways: Multicast Control Channel (MCCH) information, CBS information and System Information (SI).

Preferably, the SI is a System Information Block (SIB) designed for the MTC UE, and only the MTC UE monitors and reads the SI.

Preferably, the service node of the MTC UE group includes at least one of the followings: a Mobility Management Entity (MME), a Service General Packet Radio Service Support Node (SGSN) and a Mobile Switching Centre (MSC).

Preferably, the access network equipment includes at least one of the followings: an evolved node B (eNB), a NodeB, a Radio Network Controller (RNC), a Base Station Controller (BSC) and a Base Transceiver Station (BTS).

Preferably, the broadcast information carrying the group trigger information is sent periodically.

According to another aspect of the disclosure, a piece of MTC UE is provided, including: a receiving entity configured to receive, based on the group paging information received, the broadcast information carrying the group trigger information from the MTC server, wherein the group trigger information is used for triggering the MTC UE in the MTC UE group; and a communication entity configured to communicate with the MTC server based on the group trigger information.

Preferably, the receiving entity includes: a determining unit configured to determine that the group paging information is received by it, wherein the group paging information is used for indicating change of the broadcast information; a detecting unit configured to detect, based on the group paging information, whether the group trigger information carried in the broadcast information is the one needed by itself; an acquiring unit configured to acquire the group trigger information from the broadcast information based on a condition that a detecting result is positive; and a discarding unit configured to discard the group trigger information based on a condition that the detecting result is negative.

Preferably, the detecting unit includes: a first detecting subunit configured to detect whether the group paging information corresponds to the MTC UE group based on the group ID carried in the group paging information; a second detecting subunit configured to detect, based on a condition that a detecting result is positive, whether the group trigger information is the one needed by itself based on the group ID carried in the group trigger information; and a discarding subunit configured to discard, based on a condition that the detecting result is negative, the group paging information.

According to yet another aspect of the disclosure, a communication system for a piece of MTC UE is provided, including: an MTC server, an MTC-IWF, a PGW/GGSN, an MTC UE group, a service node of the MTC UE group and a piece of access network equipment, wherein the MTC server is configured to generate group trigger information; the MTC-IWF is configured to send the group trigger information through a T4 interface or a T5 interface or a CBC or a BMSC; the PGW/GGSN is configured to send the group trigger information through a user plane; the service node of the MTC UE group is configured to send group paging information to the MTC UE group, and send the group trigger information to the access network equipment;

the MTC UE in the MTC UE group includes: a receiving entity configured to receive, based on the group paging information received, broadcast information carrying the group trigger information from the MTC server, wherein the group trigger information is used for triggering the MTC UE in the MTC UE group; and a communication entity configured to communicate with the MTC server based on the group trigger information.

By utilizing the broadcast information to broadcast the group trigger information to the MTC UE group, the disclosure implements simultaneous triggering of multiple pieces of MTC UE in one group, optimizes group triggering process, and reduces network resources occupied in the group triggering process.

BRIEF DESCRIPTION OF THE DRAWINGS

Drawings, provided for further understanding of the disclosure and forming a part of the specification, are used to explain the disclosure together with embodiments of the disclosure rather than to limit the disclosure, wherein.

DETAILED DESCRIPTION OF THE EMBODIMENTS

The preferred embodiments are described in conjunction with the drawings as follows. It shall be understood that the preferred embodiments described herein are only used to describe and explain the disclosure and shall not be construed as improper limitations on the same. The embodiments of the present application and the features of the embodiments can be combined with each other if there is no conflict.

Figure 2:
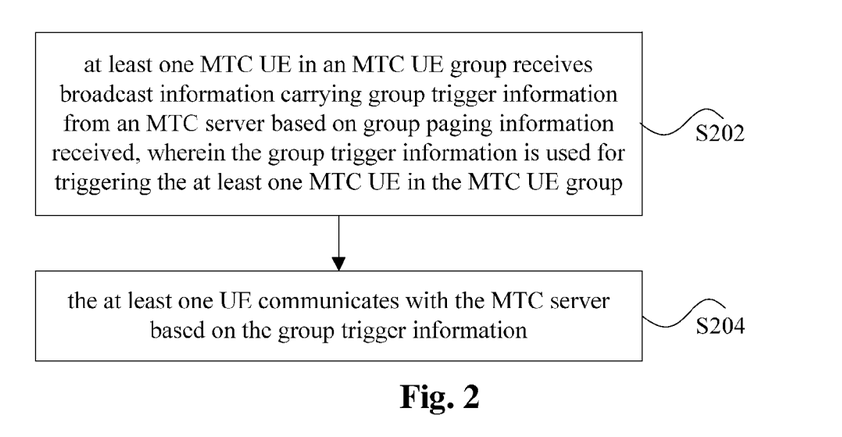
FIG. 2 is a flowchart of a communication method for a piece of MTC UE according to an embodiment of the disclosure.

An embodiment of the disclosure provides a communication method for a piece of MTC UE; FIG. 2 is a flowchart of a communication method for a piece of MTC UE according to an embodiment of the disclosure; as shown in FIG. 2, the flow includes Step 202 to Step 204 as follows.

Step 202: at least one MTC UE in an MTC UE group receives broadcast information carrying group trigger information from an MTC server based on group paging information received, wherein the group trigger information is used for triggering the at least one MTC UE in the MTC UE group.

Step 204: the at least one UE communicates with the MTC server based on the group trigger information.

In the related art, a solution on how to trigger a group of MTC UE has not been presented. In the embodiment of the disclosure, the broadcast information is employed to broadcast the group trigger information to the MTC UE group, so that multiple pieces of MTC UE in one group are triggered simultaneously, thus optimizing group triggering process and reducing the network resources occupied in the group triggering process.

Note that, the MTC server is an MTC Application Server (AS) and/or an MTC SCS.

Before the MTC server triggers the at least one MTC UE, it is needed to page the at least one MTC UE first, and for ensuring that the group trigger information received really corresponds to the MTC UE group, it is needed to detect whether the group trigger information received is the one needed by the at least one MTC UE itself. The Step 202 includes that: the at least one MTC UE determines that the group paging information is received by itself, wherein the group paging information is used for indicating change of the broadcast information; the at least one MTC UE detects, based on the group paging information, whether the group trigger information is the one needed by itself; if so, the at least one MTC UE acquires the group trigger information from the broadcast information; if not, the at least one MTC UE discards the group trigger information.

For ensuring that the group trigger information received really corresponds to the MTC UE group, the at least one MTC UE detecting, based on the group paging information, whether the group trigger information is the one needed by itself includes: the at least one MTC UE detects, based on a group ID carried in the group paging information, whether the group paging information corresponds to the MTC UE group; if so, the at least one MTC UE detects, based on the group ID carried in the group trigger information, whether the group trigger information is the one needed by itself; if not, the at least one MTC UE discards the group paging information.

Before Step 202, the method further includes: the MTC server sends the group trigger information to a piece of access network equipment through a service node of the MTC UE group; and the access network equipment which receives the group trigger information broadcasts the group trigger information to an area where the MTC UE group is.

(1) Triggering the MTC UE Group Through a Control Plane

An MTC-IWF receives the group trigger information sent by the MTC server, wherein the group trigger information at least includes one of the followings: a group ID of an MTC UE group and a physical area corresponding to the group trigger information; the MTC-IWF updates the physical area in the group trigger information to one of the following identifiers: a TAI, an RAI, an LAI and a cell identifier; the MTC-IWF inquires, based on the group ID of the MTC UE group, subscription information of the MTC UE group and the service node of the MTC UE group; and the MTC-IWF sends, through the service node, the group trigger information to the access network equipment.

Preferably, the MTC-IWF sending, through the service node, the group trigger information to the access network equipment includes: the MTC-IWF sends the group trigger information to the service node in one of the following ways: a T4 interface, a T5 interface, a CBC and a BMSC; and the service node sends the group trigger information to the access network equipment, and sends the group paging information to the MTC UE group through the access network equipment.

Preferably, the MTC-IWF sending the group trigger information to the service node in one of the following ways: the T4 interface, the T5 interface, the CBC and the BMSC includes: the MTC-IWF sends, through the T4 interface, the group trigger information to the service node in form of short message; the MTC-IWF sends, through the T5 interface, the group trigger information to the service node in form of short message or dedicated control signalling; the MTC-IWF sends, through the CBC, the group trigger information to the service node in form of CBS; and the MTC-IWF sends, through the BMSC, the group trigger information to the service node in form of MBMS.

The service node of the MTC UE group includes at least one of the followings: an MME, an SGSN and an MSC.

(2) Triggering the MTC UE Group Through a User Plane

A PGW/GGSN receives the group trigger information sent by the MTC server, wherein the MTC server and the PGW/GGSN are directly connected through a Gi/SGi interface or connected through an SCS; the PGW/GGSN sends a DDN to the service node of the MTC UE group through an SGW; at least one MTC UE receives the group paging information, and establish a PDN connection with the PGW/GGSN, wherein the at least one MTC UE in the MTC UE group shares the PDN connection; and the SGW sends the group trigger information to the MTC UE group through the PDN connection.

Preferably, the broadcast information may be sent in one of the following ways: MCCH information, CBS information and SI.

Preferably, the SI is an SIB specially designed for the MTC UE, and only the MTC UE monitors and reads the SIB information.

The service node of the MTC UE group at least includes one of the followings: an MME, an SGSN and an MSC.

The access network equipment includes at least one of the followings: an eNB, a NodeB, an RNC, a BSC and a BTS.

Preferably, the broadcast information carrying the group trigger information is sent periodically.

For making the technical solution and implementation method of the disclosure more clear, the process of implementation is elaborated below in combination with the preferred embodiments. The broadcast information in the following preferred embodiments is the SI; the process of utilizing the group trigger information to trigger a group of MTC UE is described.

It can be seen from the above embodiments that a group of MTC UE may be triggered through the control plane or the user plane in the embodiments of the disclosure; specifically, the MTC-IWF sends, through the T4/T5 interface, the group trigger information (for triggering a group of MTC UE) to the MME/SGSN/MSC; the MME/SGSN/MSC which receives the group trigger information sends the group trigger information to an RAN node, and sends the group paging information to the MTC UE group through the RAN node; the RAN node which receives the group trigger information broadcasts, through the broadcast information, the group trigger information to the MTC UE group; the PGW/GGSN receives the group trigger information, and sends the DDN to the MME/SGSN; the MME/SGSN sends the group paging information to the MTC UE group; the MTC UE group establishes a PDN connection with the PGW/GGSN, and the SGW sends the group paging information to the MTC UE group through the connection. Therefore, the group of MTC UE may be triggered through the broadcast information without need of respectively sending trigger information to each MTC UE in the MTC UE group, thus reducing quantity of sent network information and not influencing wireless capacity.

Figure 3:
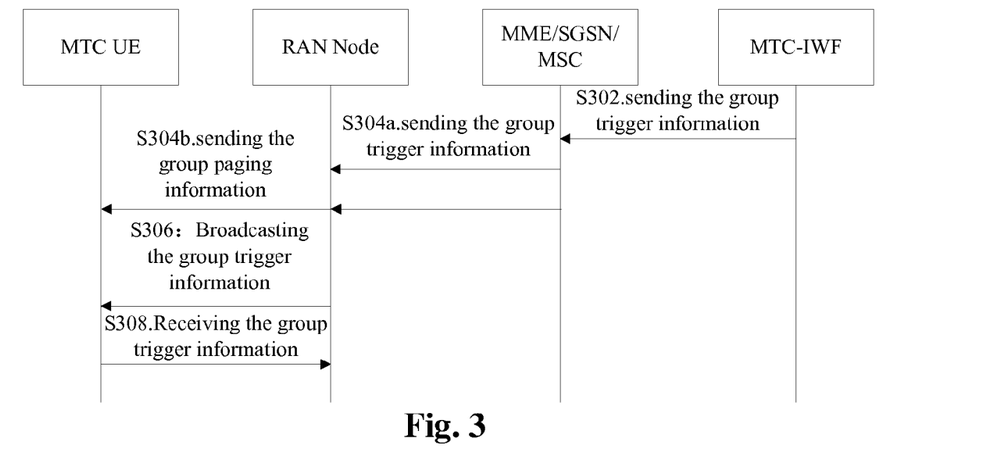
FIG. 3 is an interaction flowchart of a communication method for a piece of MTC UE according to a preferred embodiment of the disclosure.

FIG. 3 is an interaction flowchart of a communication method for a piece of MTC UE according to a preferred embodiment of the disclosure; as shown in FIG. 3, the method includes steps as follows.

Step 302: The MTC-IWF sends group trigger information of an MTC UE group to an MME/SGSN/MSC.

In this step, the MTC server sets content of the group trigger information, and sends the group trigger information to the SCS, wherein the SCS is outside or in the 3GPP network; the group trigger information at least includes: a group ID of an MTC UE group, which is used for uniquely identifying the MTC UE group needing to be triggered.

The SCS sends the group trigger information to the MTC-IWF; after authenticating the group trigger information received, the MTC-IWF inquires, through the HSS/HLR, the subscription information of the UE and the service node of the MTC UE, such as MME, SGSN and MSC.

The MTC-IWF sends the group trigger information to the MME/SGSN/MSC.

Step 304a: The MME/SGSN/MSC which receives the group trigger information sends the group trigger information to an RAN node, wherein the RAN node is at least one of the followings: an eNB, a NodeB, an RNC, a BSC and a BTS.

Step 304b: The MME/SGSN/MSC sends, through the RAN node, the group paging information to at least one MTC UE in the MTC UE group.

The group paging information includes the group ID; the MTC UE detects, according to the group ID, whether the group paging information is the one needed by it; if not, discard the group paging information; if so, turn to other steps. The group paging information is used for indicating to the MTC UE group that the broadcast information, which includes the group trigger information, changes; and values of Page Frame (PF) and Page Occasion (PO) of the group paging information are got by calculating through the group ID or a group International Mobile Subscriber Identity (IMSI) or notified by the broadcast information.

Step 306: The RAN node broadcasts the trigger information to the at least one MTC UE through the broadcast information.

The broadcast information is dedicated broadcast information, namely the broadcast information specially designed for triggering the MTC UE group; the broadcast information includes content of the MTC UE group trigger, for example, the AS/SCS expects the MTC UE group which receives the trigger information to respond (e.g., sending a status report immediately, or sending a status report after a time).

The group trigger information is sent periodically; the above broadcast period is sent to a target MTC UE group by the existing broadcast information.

Step 308: The at least one MTC UE which receives the group paging information receives the group trigger information. The at least one MTC UE reads the group trigger information in corresponding resources and communicates with the AS/SCS according to content of the group trigger information.

Preferred Embodiment 1

Figure 4:
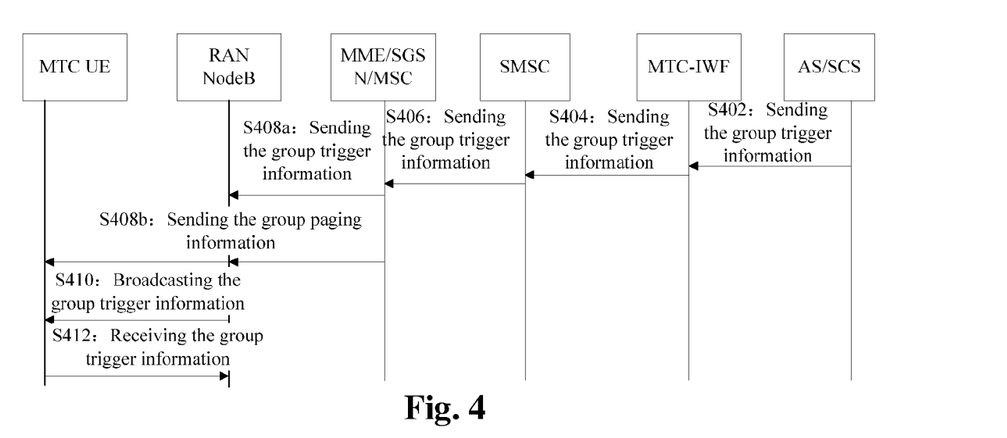
FIG. 4 is an interaction flowchart of a communication method for a piece of MTC UE according to a first preferred embodiment of the disclosure.

The present preferred embodiment describes a scenario that the MTC-IWF sends group trigger information through a T4 interface and utilizes broadcast information to implement triggering of a group of MTC UE; FIG. 4 is an interaction flowchart of a communication method for a piece of MTC UE according to a first preferred embodiment of the disclosure; as shown in FIG. 4, the method includes steps as follows.

Step 402: The MTC AS sets group trigger indication information, and sends the group trigger indication information to the MTC-IWF (through the SCS).

In this step, the AS is outside the 3GPP carrier network, the SCS is in or outside the 3GPP carrier network, and the MTC-IWF is in the 3GPP network. The MTC-IWF needs to authenticate the group trigger information after receiving it. Note that, the group trigger information sent to the MTC-IWF by the SCS at least includes: a group ID of an MTC UE group and a physical area corresponding to the group trigger information (i.e., in which physical areas the group trigger information is sent).

Step 404: The MTC-IWF sends the group trigger information to a Short Message-Service Centre (SMSC) through a T4 interface.

In this step, the MTC-IWF sends the group trigger information to the SMSC in form of short message.

The MTC-IWF inquires, based on the group ID in the group trigger information, the HSS/HLR of subscription information of the MTC UE group and information about the service node of the MTC UE group, and adds the information about the service node of the MTC UE group to the group trigger information.

The MTC-IWF generally needs to update a physical area in the group trigger information to one of the following corresponding identifiers: a TAI, an RAI, an LAI and a cell identifier.

Step 406: The SMSC sends the group trigger information to the MME/SGSN/MSC.

In this step, the SMSC sends the group trigger information to the MME/SGSN/MSC in form of short message; the MME/SGSN/MSC is the service node of the target MTC UE group, that is, the target MTC UE group registers in the MME/SGSN/MSC. The group trigger information is a short message, and a target MTC UE identity in the short message is the group ID.

Step 408a: The MME/SGSN/MSC sends the group trigger information to the RAN node.

In this step, the MME/SGSN/MSC may inquire, through the HSS/HLR, a cell corresponding to the group ID, and sends the cell identifier to the corresponding RAN node. The RAN node is the eNB, the NodeB, the RNC, the BSC or the BTS.

Step 408b: The MME/SGSN/MSC sends, through the RAN node, the group paging information to the MTC UE group.

In this step, the group paging information is sent through the RAN node and is used for indicating to the MTC UE group that the broadcast information including the group trigger information changes.

The group paging information at least includes the group ID; at least one MTC UE detects, based on the group ID in the group paging information, whether the group paging information is the one needed; if not, discard the group paging information; if so, turn to other steps. The values of PF and PO/Page subframe of the group paging information are got by calculating according to the group ID or the group IMSI.

Step 410: The RAN node broadcasts the broadcast information including the group trigger information to the MTC UE group.

In this step, the RAN node broadcasts, through the broadcast information, the group trigger information to a cell where the target MTC UE group is, wherein the broadcast information is dedicated system broadcast information, namely the broadcast information aiming at the MTC UE group; the broadcast information is sent by the RAN node periodically; the above period is sent to the least one MTC UE through the existing broadcast information. The broadcast information includes content of the MTC UE group trigger, for example, the AS/SCS expects the MTC UE group which receives the group trigger information to respond (e.g., the MTC UE sends a status report immediately, or sends a status report after a time).

Step 412: The at least one MTC UE which receives the group paging information receives the group trigger information.

In this step, the at least one MTC UE detects, based on the group ID in the group trigger information, whether the group trigger information is the one needed; if so, the at least one MTC UE reads the group trigger information, and communicates with the AS/SCS according to the content of the group trigger information; if not, discard the group trigger information.

Preferred Embodiment 2

Figure 5:
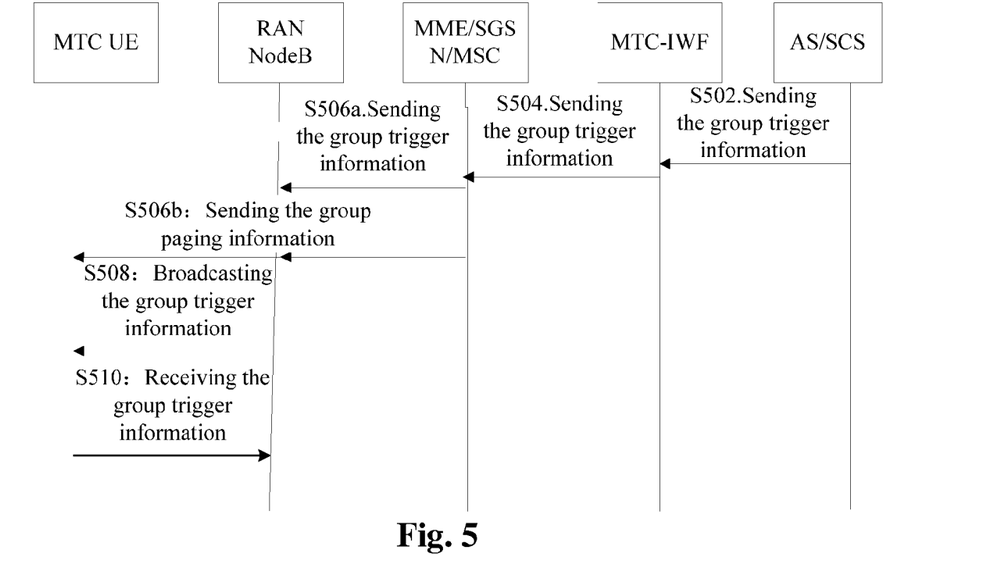
FIG. 5 is an interaction flowchart of a communication method for a piece of MTC UE according to a second preferred embodiment of the disclosure.

The present preferred embodiment describes a scenario that the MTC-IWF sends group trigger information through a T5 interface and utilizes broadcast information to trigger a group of MTC UE; FIG. 5 is an interaction flowchart of a communication method for a piece of MTC UE according to a second preferred embodiment of the disclosure; as shown in FIG. 5, the method includes steps as follows.

Step 502: an MTC AS sets group trigger indication information, and sends the group trigger indication information to an MTC-IWF (through the SCS). Specifically, this step is the same as Step 402, so it will not be repeated here.

Step 504: The MTC-IWF sends the group trigger information to the MME/SGSN/MSC through the T5 interface. Specifically, the MTC-IWF inquires, based on the group ID in the group trigger information, the HSS/HLR of the information about the service node of the target MTC UE group; in the present preferred embodiment, the service node of the MTC UE group is the MME/SGSN/MSC.

Note that, the group trigger information may be sent to the MME/SGSN/MSC through a short message or dedicated control signalling; at this point, the group trigger information is a short message or control signalling.

Step 506a: The MME/SGSN/MSC sends the group trigger information to the RAN node.

Step 506b: The MME/SGSN/MSC sends the group paging information to the MTC UE group through the RAN node.

In the present preferred embodiment, Step 506a and Step 506b are the same as Step 408a and Step 408b respectively, so they will not be repeated here.

Step 508: The RAN node broadcasts the broadcast information including the group trigger information to the MTC UE group. This step is the same as Step 410, so it will not be repeated here.

Step 510: The MTC UE which receives the group paging information receives the group trigger information. This step is the same as Step 412, so it will not be repeated here.

Preferred Embodiment 3

Figure 6:
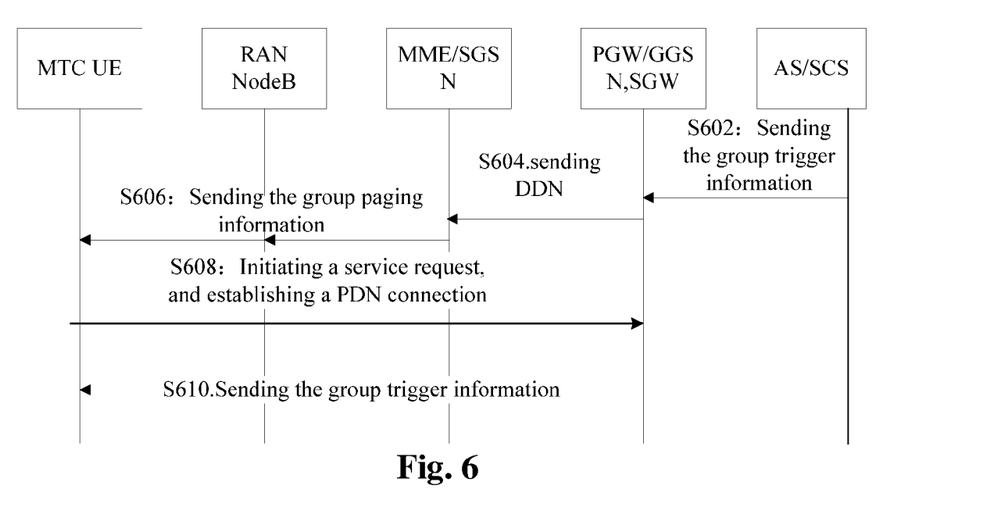
FIG. 6 is an interaction flowchart of a communication method for a piece of MTC UE according to a third preferred embodiment of the disclosure.

The present preferred embodiment describes a scenario that an AS/SCS sends group trigger information through a user plane and uses the user plane to trigger a group of MTC UE; FIG. 6 is an interaction flowchart of a communication method for a piece of MTC UE according to a third preferred embodiment of the disclosure; as shown in FIG. 6, the method includes steps as follows.

Step 602: a MTC AS sets group trigger indication information, and sends the group trigger indication information to a PGW/GGSN (directly or through the SCS).

In this step, the AS may be directly connected with the PGW/GGSN through the Gi/SGi interface or through the SCS.

Step 604: The PGW/GGSN sends the group trigger information to the SGW; the SGW sends DDN information to the MME/SGSN.

Note that, the SGW may simultaneously send the DDN to the MME and the SGSN according to network configuration information, or send the DDN to one of the MME/SGSN.

Step 606: The MME/SGSN sends the group paging information to the MTC UE group through the RAN node.

In this step, the MME/SGSN is the service node which receives the DDN information. The group paging information at least includes the group ID, and the value of PF/PO of the group paging information is got by calculating through the group ID or the group IMSI.

Step 608: at least one MTC UE which receives the group paging information initiates a service request process, and establishes a PDN connection with the PGW/GGSN, wherein the PDN connection is a shared connection, that is the PDN connection includes a plurality of PDN connections to multiple pieces of MTC UE and multiple pieces of MTC UE belonging to a group share a PDN connection (the same IP address and port).

Step 610: The SGW sends the group trigger information to the at least one MTC UE through the PDN connection.

It should be noted that, these steps presented in the flowchart of the accompanying drawings can be executed in a computer system like a group of machine-executable instructions; besides, although a logical sequence is presented in the flowchart, in some cases, the presented or described steps can be executed in an order different from that described here.

Figure 7:
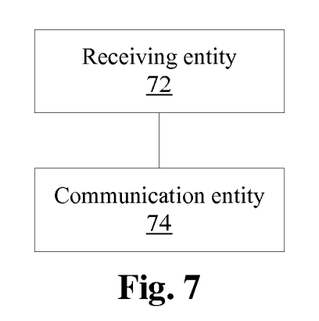
FIG. 7 is a structure diagram of a piece of MTC UE according to an embodiment of the disclosure.

The embodiment of the disclosure also provides a piece of MTC UE; the MTC UE can be used for implementing the above communication method for a piece of MTC UE. FIG. 7 is a structure diagram of a piece of MTC UE according to an embodiment of the disclosure; as shown in FIG. 7, the MTC UE includes a receiving entity 72 and a communication entity 74. The structure is described in detail below.

The receiving entity 72 is configured to receive, based on group paging information received, the broadcast information carrying the group trigger information from the MTC server, wherein the group trigger information is used for triggering at least one MTC UE in an MTC UE group; the communication entity 74 is connected to the receiving entity 72 and is configured to communicate with the MTC server based on the group trigger information received by the receiving entity 72.

Preferably, the receiving entity 72 includes: a determining unit configured to determine that the group paging information is received by it, wherein the group paging information is used for indicating change of the broadcast information; a detecting unit connected to the determining unit and configured to detect, based on the group paging information, whether the group trigger information carried in the broadcast information is the one needed by it; an acquiring unit connected to the detecting unit and configured to acquire the group trigger information from the broadcast information based on a condition that the detecting result of the detecting unit is positive; and a discarding unit connected to the detecting unit and configured to discard the group trigger information based on a condition that the detecting result of the detecting unit is negative.

Preferably, the detecting unit further includes: a first detecting subunit configured to detect whether the group paging information corresponds to the MTC UE group based on the group ID carried in the group paging information; a second detecting subunit connected to the first detecting subunit and configured to detect, based on a condition that the detecting result of the first detecting subunit is positive, whether the group trigger information is the one needed by it based on the group ID carried in the group trigger information; and a discarding subunit connected to the first detecting subunit and configured to discard, based on a condition that the detecting result of the first detecting subunit is negative, the group paging information.

Figure 8:
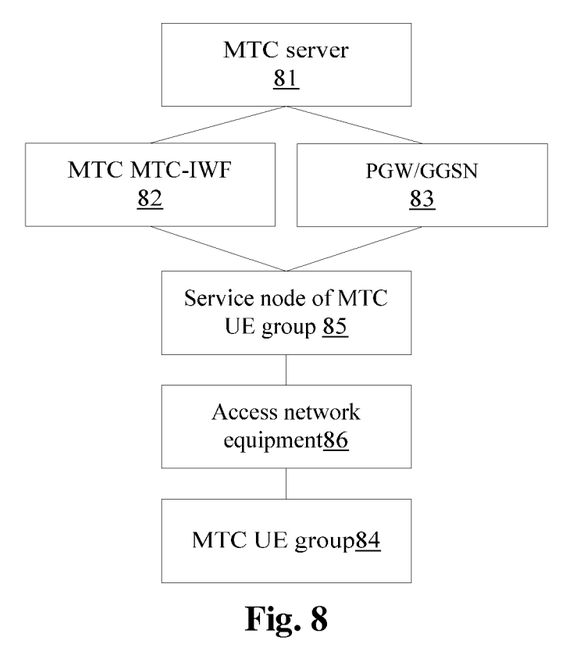
FIG. 8 is a structure diagram of a communication system for a piece of MTC UE according to an embodiment of the disclosure.

The embodiment of the disclosure also provides a communication system for a piece of MTC UE; the communication system for the MTC UE may be used for implementing the above communication method for the MTC UE. FIG. 8 is a structure diagram of a communication system for a piece of MTC UE according to an embodiment of the disclosure; as shown in FIG. 8, the communication system for the MTC UE includes an MTC server 81, an MTC-IWF 82, a PGW/GGSN 83, an MTC UE group 84, a service node of the MTC UE group 85 and a piece of access network equipment 86. The structure is described in detail below.

The MTC server 81 is configured to generate group trigger information; the MTC-IWF 82 is configured to send the group trigger information through a T4 interface or a T5 interface or a CBS or an MBMS; the PGW/GGSN 83 is configured to send the group trigger information through a user plane; the service node of the MTC UE group 85 is configured to send group paging information to the MTC UE group, and send the group trigger information to the access network equipment 86; the MTC UE in the MTC UE group 84 includes: a receiving entity configured to receive, based on the group paging information received, the broadcast information carrying the group trigger information from the MTC server 81, wherein the group trigger information is used for triggering at least one MTC UE in the MTC UE group; and a communication entity connected to the receiving entity and configured to communicate with the MTC server 81 based on the group trigger information received by the receiving entity.

It should be noted that the communication system for the MTC UE described in the embodiment of device corresponds to the embodiment of method; its specific process of implementation has been elaborated in the embodiment of method, so it will not be repeated here.

Figure 9:
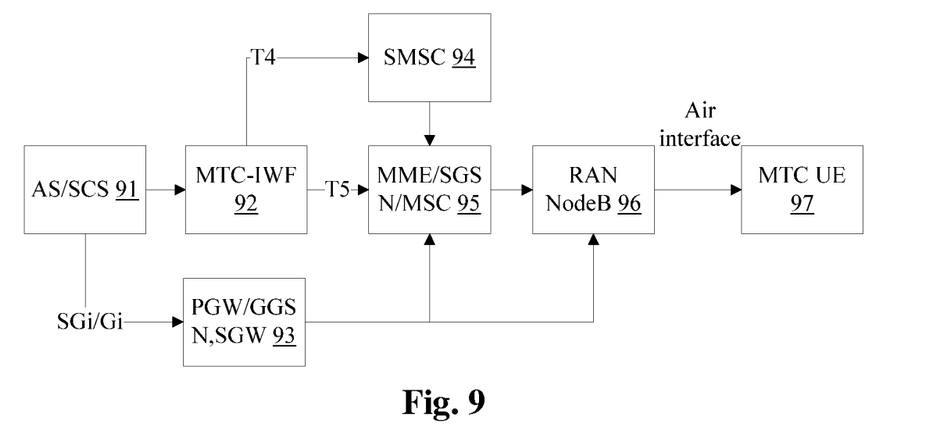
FIG. 9 is a structure diagram of a communication system for a piece of MTC UE according to a preferred embodiment of the disclosure.

In a preferred embodiment, the communication system for a piece of MTC UE can also include the following entities or devices; as shown in FIG. 9, the system includes: an AS/SCS 91, an MTC-IWF 92, a PGW/GGSN and SGW 93, an SMSC 94, an MME/SGSN/MSC 95, a radio access network node 96 and a piece of MTC UE 97.

The AS/SCS 91 (implementing a function of the MTC server 81) is configured to generate the MTC group trigger information, wherein the group trigger information includes a group ID of the MTC UE group;

the MTC-IWF 92 (implementing a function of the MTC-IWF 82) is configured to select a triggering route and send the received MTC UE group trigger information through the T4/T5/user plane;

the PGW/GGSN and SGW 93 (implementing a function of the PGW/GGSN 83) are configured to receive the group trigger information sent by the AS/SCS and send the group trigger information received to the MTC UE 97 through the user plane;

the SMSC 94 is configured to receive the short message group trigger information sent by the MTC-IWF 92 and send the group trigger information received to the MME/SGSN/MSC 95;

the MME/SGSN/MSC 95 (implementing a function of the service node of the MTC UE group 85) is configured to receive the group trigger information sent by the MTC-IWF 92 or the SMSC 94, and send the group trigger information to the radio access network node 96; the MME/SGSN/MSC 95 is further configured to send, through the radio access network node 96, the group paging information to the MTC UE 97;

the radio access network node 96 (implementing a function of the access network equipment 86) is configured to receive the group trigger information sent by the PGW/GGSN and SGW 93 or the MME/SGSN/MSC 95, and send the group trigger information to the target UE through the broadcast information or user plane data; the radio access network node 96 includes at least one of the followings: the BSC, the BTS, the RNC, the NodeB and the eNodeB; and the MTC UE 97 (implementing a function of the MTC UE group 84) is configured to receive the group paging information and the group trigger information, and to communicate with the AS/SCS 91 according to the content of the group trigger information. The MTC UE is a group of MTC UE, namely two or more than two pieces of MTC UE; a piece of MC equipment may be either an MTC UE gateway or a single piece of MTC UE.

To sum up, according to the above embodiments of the disclosure, a communication method and system for a piece of MTC UE are provided. By utilizing the broadcast information to broadcast the group trigger information to the MTC UE group, the disclosure implements simultaneous triggering of multiple pieces of MTC UE in one group, optimizes group triggering process, and reduces network resources occupied in the group triggering process.

Obviously, those skilled in the art should appreciate that above-mentioned entities and steps of the disclosure can be realized by a general-purpose computing device, and they can be centralized in a single computing device or distributed on a network composed of multiple computing devices; optionally, they can be realized by program code which is capable of being executed by the computing device, so that they can be stored in a storage device and executed by the computing device; or they are made into integrated circuit entities, respectively; or multiple entities and steps of them are made into a single integrated circuit entity to realize. In this way, the disclosure is not limited to any particular combination of hardware and software.

The above is only the preferred embodiment of the disclosure and not intended to limit the disclosure; for those skilled in the art, the disclosure may have various modifications and changes. Any modifications, equivalent replacements, improvements and the like within the spirit and principle of the disclosure shall fall within the scope of the claims of the disclosure.

What is claimed is:

1. A communication method for a Machine-Type Communication (MTC) User Equipment (UE), comprising:
   at least one MTC UE in an MTC UE group receiving broadcast information carrying group trigger information from an MTC server based on group paging information received, wherein the group trigger information is used for triggering the at least one MTC UE in the MTC UE group; and
   the at least one MTC UE communicating with the MTC server based on the group trigger information;
   wherein the at least one MTC UE in the MTC UE group receiving the broadcast information carrying the group trigger information from the MTC server comprises:
   the at least one MTC UE determining that the group paging information is received by itself, wherein the group paging information is used for indicating change of the broadcast information;
   the at least one MTC UE detecting, based on the group paging information, whether the group trigger information carried in the broadcast information is the one needed by itself;
   if so, the at least one MTC UE acquiring the group trigger information from the broadcast information;
   if not, the at least one MTC UE discarding the group trigger information.

2. The method according to claim 1, wherein the at least one MTC UE detecting, based on the group paging information, whether the group trigger information carried in the broadcast information is the one needed by itself comprises that:
   the at least one MTC UE detecting, based on a group identity (ID) carried in the group paging information, whether the group paging information corresponds to the MTC UE group;
   if so, the at least one MTC UE detecting, based on the group identity (ID) carried in the group trigger information, whether the group trigger information is the one needed by itself;

if not, the at least one MTC UE discarding the group paging information.

3. The method according to claim 1, wherein before the at least one MTC UE in the MTC UE group receiving the broadcast information carrying the group trigger information from the MTC server based on the group paging information received, the method further comprises:
sending, by the MTC server, the group trigger information to a piece of access network equipment through a service node of the MTC UE group; and
broadcasting, by the access network equipment which receives the group trigger information, the group trigger information to an area where the MTC UE group is.

4. The method according to claim 3, wherein sending, by the MTC server, the group trigger information to the access network equipment through the service node of the MTC UE group comprises:
an MTC-Interworking Function (MTC-IWF) receiving the group trigger information sent by the MTC server, wherein the group trigger information comprises at least one of the following: a group ID of the MTC UE group and a physical area corresponding to the group trigger information;
the MTC-IWF updating the physical area in the group trigger information to one of the following identifiers: a Tracking Area Identifier (TAI), a Router Area Identifier (RAI), a Location Area Identifier (LAI) and a cell identifier;
the MTC-IWF inquiring, based on the group ID of the MTC UE group, subscription information of the MTC UE group and the service node of the MTC UE group; and
the MTC-IWF sending, through the service node, the group trigger information to the access network equipment.

5. The method according to claim 4, wherein the MTC-IWF sending, through the service node, the group trigger information to the access network equipment comprises:
the MTC-IWF sending the group trigger information to the service node in one of the following ways: a T4 interface, a T5 interface, a Cell Broadcast Centre (CBC) and a Broadcast Multicast Service Centre (BMSC); and
the service node sending the group trigger information to the access network equipment, and sending the group paging information to the MTC UE group through the access network equipment.

6. The method according to claim 5, comprising:
the MTC-IWF sending, through the T4 interface, the group trigger information to the service node in a form of a short message;
the MTC-IWF sending, through the T5 interface, the group trigger information to the service node in a form of a short message or dedicated control signalling;
the MTC-IWF sending, through the CBC, the group trigger information to the service node in a form of a Cell Broadcast Service (CBS); and
the MTC-IWF sending, through the BMSC, the group trigger information to the service node in a form of a Multimedia Broadcast Multicast Service (MBMS).

7. The method according to claim 1, wherein before the at least one MTC UE in the MTC UE group receiving, based on the group paging information received, the broadcast information carrying the group trigger information from the MTC server, the method further comprises:
receiving, by a Packet Data Network Gateway (PGW)/Gateway General Packet Radio Service Support Node (GGSN), the group trigger information sent by the MTC server, wherein the MTC server and the PGW/GGSN are connected directly through a Gi/SGi interface or connected through a Service Capability Server (SCS); sending, by the PGW/GGSN, a Downlink Data Notification (DDN) to the service node of the MTC UE group through a Signalling Gateway (SGW);
receiving, by the at least one MTC UE, the group paging information, and establishing a Public Data Network (PDN) connection with the PGW/GGSN, wherein the MTC UE in the MTC UE group shares the PDN connection; and
sending, by the SGW, the group trigger information to the MTC UE group through the PDN connection.

8. The method according to any one of claim 1, wherein the broadcast information can be sent in one of the following ways: Multicast Control Channel (MCCH) information, Cell Broadcast Service (CBS) information and System Information (SI).

9. The method according to claim 8, wherein the SI is a System Information Block (SIB) designed for the MTC UE, and only the MTC UE monitors and reads the SI.

10. The method according to any one of claim 1, wherein the service node of the MTC UE group comprises at least one of the following: a Mobility Management Entity (MME), a Service General Packet Radio Service Support Node (SGSN) and a Mobile Switching Centre (MSC).

11. The method according to any one of claim 1, wherein the access network equipment comprises at least one of the following: an evolved node B (eNB), a NodeB, a Radio Network Controller (RNC), a Base Station Controller (BSC) and a Base Transceiver Station (BTS).

12. The method according to any one of claim 1, wherein the broadcast information carrying the group trigger information is sent periodically.

13. A Machine-Type Communication (MTC) User Equipment (UE), comprising:
a receiving entity configured to receive, based on group paging information received, broadcast information carrying group trigger information from an MTC server, wherein the group trigger information is used for triggering the MTC UE in the MTC UE group; and
a communication entity configured to communicate with the MTC server based on the group trigger information;
wherein the receiving entity comprises:
a determining unit configured to determine that the group paging information is received by itself, wherein the group paging information is used for indicating change of the broadcast information;
a detecting unit configured to detect, based on the group paging information, whether the group trigger information carried in the broadcast information is the one needed by itself;
an acquiring unit configured to acquire the group trigger information from the broadcast information based on a condition that a detecting result is positive; and
a discarding unit configured to discard the group trigger information based on a condition that the detecting result is negative.

14. The MTC UE according to claim 13, wherein the detecting unit comprises:
a first detecting subunit configured to detect whether the group paging information corresponds to the MTC UE group based on a group identity (ID) carried in the group paging information;
a second detecting subunit configured to detect, based on a condition that a detecting result is positive, whether the group trigger information is the one needed by itself based on the group ID carried in the group trigger information; and
a discarding subunit configured to discard, based on a condition that the detecting result is negative, the group paging information.

15. A communication system for a Machine-Type Communication (MTC) User Equipment (UE), comprising: an MTC server, an MTC-Interworking Function (MTC-IWF), a Packet Data Network Gateway (PGW)/Gateway General Packet Radio Service Support Node (GGSN), an MTC UE group, a service node of the MTC UE group and a piece of access network equipment, wherein
the MTC server is configured to generate group trigger information;
the MTC-IWF is configured to send the group trigger information through a T4 interface or a T5 interface or a Cell Broadcast Centre (CBC) or a Broadcast Multicast Service Centre (BMSC);
the PGW/GGSN is configured to send the group trigger information through a user plane;
the service node of the MTC UE group is configured to send group paging information to the MTC UE group, and send the group trigger information to the access network equipment;
the MTC UE in the MTC UE group comprises:
a receiving entity configured to receive, based on the group paging information received, broadcast information carrying the group trigger information from the MTC server, wherein the group trigger information is used for triggering the MTC UE in the MTC UE group; and
a communication entity configured to communicate with the MTC server based on the group trigger information;
wherein at least one MTC UE in the MTC UE group is configured to perform the following operation:
the at least one MTC UE determining that the group paging information is received by itself, wherein the group paging information is used for indicating change of the broadcast information;
the at least one MTC UE detecting, based on the group paging information, whether the group trigger information carried in the broadcast information is the one needed by itself;
if so, the at least one MTC UE acquiring the group trigger information from the broadcast information;
if not, the at least one MTC UE discarding the group trigger information.

\* \* \* \* \*